United States Patent
Simon Bacardit

(10) Patent No.: US 6,871,493 B2
(45) Date of Patent: Mar. 29, 2005

(54) BRAKING DEVICE FOR A MOTOR VEHICLE, COMPRISING A VACUUM PUMP

(75) Inventor: Juan Simon Bacardit, Barcelone (ES)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 10/664,129

(22) Filed: Sep. 17, 2003

(65) Prior Publication Data

US 2004/0074233 A1 Apr. 22, 2004

(51) Int. Cl.[7] ............................................. F16D 31/02
(52) U.S. Cl. ........................... 60/412; 60/407; 91/376 R
(58) Field of Search ........................... 60/412, 407, 397; 91/376 R

(56) References Cited

U.S. PATENT DOCUMENTS

| | | | | |
|---|---|---|---|---|
| 4,109,464 A | * | 8/1978 | Wickland | 60/397 |
| 4,279,193 A | * | 7/1981 | Satoh | 91/376 R |
| 5,515,676 A | * | 5/1996 | Earle | 60/412 |
| 5,961,189 A | * | 10/1999 | Lutteke et al. | 60/412 |
| 6,116,141 A | * | 9/2000 | Levrai | 91/376 R |
| 6,301,883 B1 | * | 10/2001 | Fulks et al. | 60/412 |

* cited by examiner

*Primary Examiner*—Edward K. Look
*Assistant Examiner*—Michael Leslie
(74) *Attorney, Agent, or Firm*—Leo H McCormick, Sr.; Warren Comstock

(57) ABSTRACT

A braking device, particularly for a motor vehicle, comprising a master cylinder (10) associated with a pneumatic booster (12), and a vacuum pump (36) to create a vacuum in the vacuum chamber (16) of the booster, characterized in that the vacuum pump (36) is fixed to the envelope (14) of the booster on the inside of the latter within the vacuum chamber (16).

11 Claims, 1 Drawing Sheet

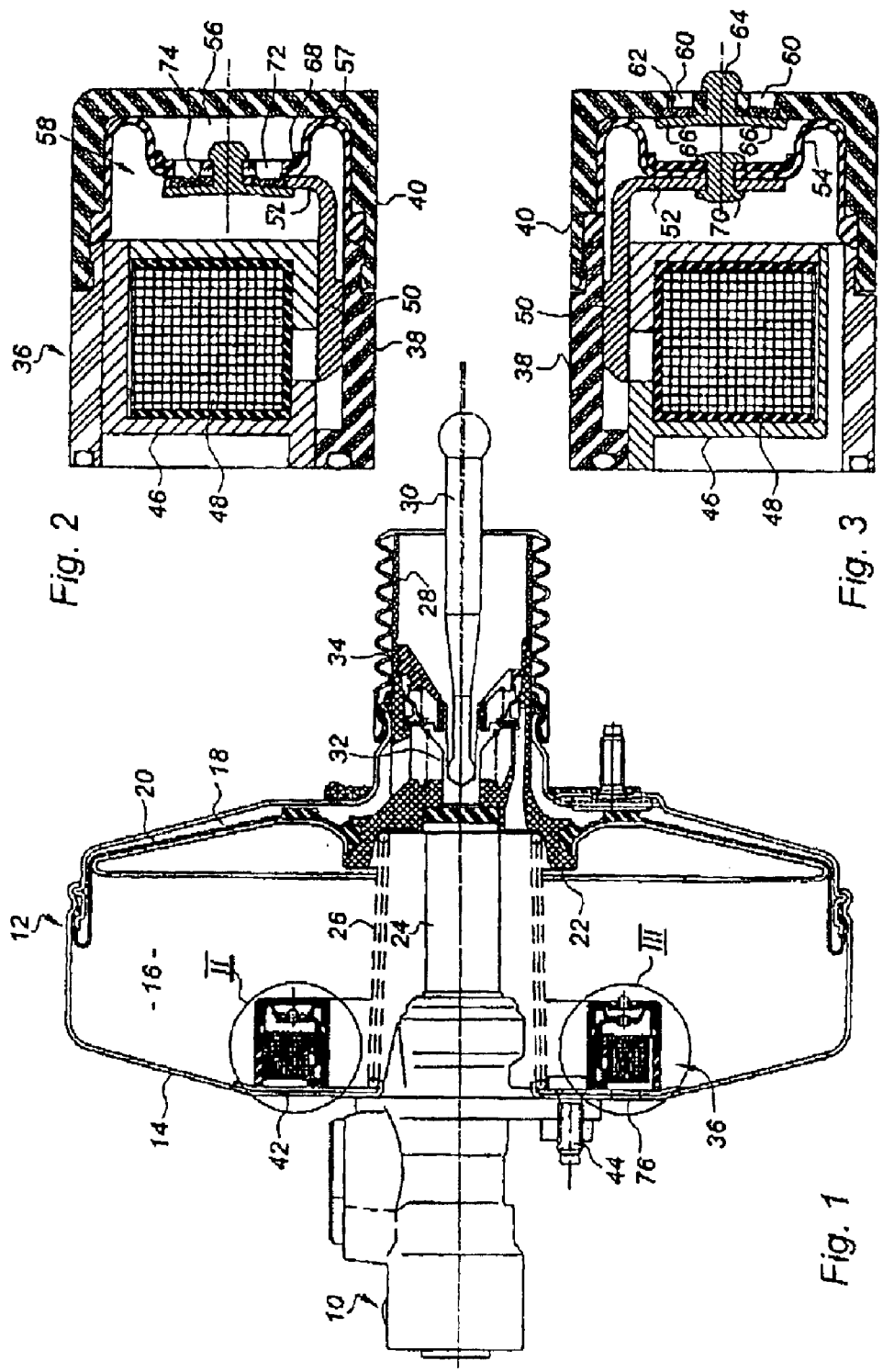

BRAKING DEVICE FOR A MOTOR VEHICLE, COMPRISING A VACUUM PUMP

The invention relates to a braking device, particularly for a motor vehicle, comprising a pneumatic booster.

In a way well known to those skilled in the art, a pneumatic booster comprises two chambers, respectively a vacuum chamber and a work chamber, which are delimited inside a rigid envelope via a sealed membrane the central part of which is secured to an axial piston of the booster and the periphery of which is fixed to the envelope.

The vacuum chamber is connected to a vacuum source while the work chamber is connected selectively to the ambient atmosphere during braking, the difference in pressure between the two chambers providing pneumatic boosting that amplifies the force exerted by the driver on the brake pedal.

In general, the vacuum source is formed by the inlet manifold of the internal combustion engine of the vehicle. As an alternative, use may also be made of a vacuum pump driven by the engine of the vehicle or by an electric motor.

Document EP-A-0603022 has already proposed for the vacuum pump and means for regulating the vacuum, to be fixed to the brake master cylinder, the vacuum pump being connected by an intake pipe to the vacuum chamber of the booster. This then forms a vacuum pump/master cylinder/booster assembly that is then fixed in the engine compartment of the vehicle and connected up to an electrical power supply.

The particular object of the invention is to reduce the bulk of such an assembly and to facilitate and simplify the process of assembling it.

For this purpose, the invention proposes a braking device, particularly for a motor vehicle, comprising a pneumatic booster comprising an envelope in which there is delimited a vacuum chamber, and a vacuum pump connected to said chamber to create a vacuum therein, characterized in that the vacuum pump is fixed to the envelope of the booster on the inside thereof inside the vacuum chamber.

Arranging the vacuum pump inside the booster reduces the overall bulk of the booster and simplifies the assembly thereof, because there is no longer any need to connect the vacuum pump to the booster by an intake pipe. In addition, the vacuum pump housed inside the booster is protected from any attack from somewhat aggressive external agents present in the engine compartment of a motor vehicle.

According to another feature of the invention, the vacuum pump comprises an annular casing in which reciprocating controlled-displacement intake and delivery means are housed, this casing being fixed to a roughly radial part of the envelope of the booster.

Advantageously, this vacuum pump of annular shape is coaxial with the booster and, by virtue of its annular shape, does not in any way impede the connecting of the booster to a master cylinder of the braking device.

According to yet another feature of the invention, the vacuum pump is of the electromagnetic type and comprises an annular armature mounted in the aformentioned casing, a coil housed in the armature, an axial core plunger of tubular shape able to move in axial translation in the armature and the coil, and a sealed membrane borne by the core plunger and by the casing and dividing the internal volume of the casing into an intake chamber and a delivery chamber.

The intake chamber of the casing communicates with the vacuum chamber of the booster via at least one orifice formed in a wall of the casing and fitted with a directional intake valve while the delivery chamber of the casing opens to the outside of the casing and communicates with the outside of the booster via at least one orifice in the envelope of the booster, and is connected to the intake chamber by at least one orifice formed in the membrane and fitted with a directional delivery valve.

Advantageously, these valves are shutters with an elastically deformable leaf for shutting off an orifice.

In general, the invention makes it possible to reduce the bulk of an assembly made up of a master cylinder and of a pneumatic booster, it simplifies the process of assembling this assembly and reduces its cost.

The invention will be better understood and other features, details and advantages thereof will become more clearly apparent from reading the description which follows, given by way of example with reference to the attached drawings.

FIG. 1 is a schematic view in axial section of an assembly formed of a master cylinder and of a pneumatic booster; and FIGS. 2 and 3 are views on a larger scale of the ringed details II and III of FIG. 1.

In the description, by convention, everything situated on the left in the drawings is described as being at the front, and everything situated on the right is described as being at the rear.

The assembly depicted in FIG. 1 comprises a brake master cylinder 10 associated with a pneumatic booster 12 which essentially comprises a rigid envelope 14 in which a vacuum chamber 16 or front chamber and a work chamber 18 or rear chamber are delimited by a sealed membrane 20, the periphery of which is fixed to the envelope 14 and the central part of which is fixed to an axial piston 22 of the booster, this axial piston being connected by a push rod 24 to a piston of the master cylinder 10 and being urged constantly rearward by a return spring 26 bearing at its ends against the front part of the envelope 14 and against the piston 22.

The rear part 28 of the piston 22 is of tubular cylindrical shape and receives an axial control rod 30 the rear end of which is connected to a brake pedal (not depicted). The front end of the control rod 30 has a distributor plunger 32 which, at its rear end, collaborates with an annular shutter of a three-way valve 34 mounted in the rear cylindrical part 28 of the piston 22 to control the selective supply of air at atmospheric pressure to the work chamber 18 of the booster, according to the force applied to the control rod 30 by the brake pedal.

The front chamber or vacuum chamber 16 of the booster is connected to a vacuum source which, according to the invention, consists of a vacuum pump 36 of electromagnetic type mounted inside the booster 12 in the vacuum chamber 16 and fixed to the radial front wall of the envelope 14, this vacuum pump 36 being of annular shape and extending around the rear end of the master cylinder 10, housed axially inside the vacuum chamber 16.

As can best be seen in the enlarged views of FIGS. 2 and 3, the vacuum pump 36 comprises an annular casing made in two parts 38 and 40 axially juxtaposed and fixed to one another by elastic clip fastening, in a more or less sealed manner.

Conveniently, the front part 38 of the casing may be fixed by any appropriate means to an annular reinforcing plate 42 applied to the front wall of the envelope 14 inside the chamber 16 and serving to strengthen this front wall so that it can be fixed by screws 44 to a fixed support structure.

A magnetic armature 46 of annular shape is housed in the front part 38 of the casing and contains an electric coil 48. A core plunger 50 made of ferromagnetic material is housed inside the casing in the gap of the armature 46 and can move in axial translation between the internal cylindrical surface of the armature 46 and the corresponding surface of the front part 38 of the casing.

The core plunger 50, of tubular cylindrical shape, has an outwardly directed radial rim 52 at its rear end and a sealed and flexible membrane 54, for example made of rubber or elastomer, of annular shape, is fixed by its central part to this radial rim 52 and at its internal and external periphery to the casing of the vacuum pump, where the front 38 and rear 40 parts of the casing meet.

The membrane 54 divides the internal volume of the rear part 40 of the casing into two chambers, one of them an intake chamber 56 situated at the rear and the other a delivery chamber 58 situated at the front.

The intake chamber 56 communicates with the vacuum chamber 16 of the booster via one or more orifices 60 in the rear wall of the part 40 of the casing and which are fitted with a directional intake valve 62, formed of a shutter with elastically deformable leaves.

In the example of FIG. 3, this shutter comprises a body 64 fixed by riveting in an orifice in the rear radial wall of the part 40 of the casing and has two flanges 66 forming the elastically deformable leaves and covering the orifices 60 in the rear wall of the casing. Liners made of rubber or the like may be fixed to these leaves 66 in order to seal off the orifices 60. The leaves 66 extend inside the casing and are applied against the mouths of the orifices 60 by elasticity.

The central part of the membrane 54 of the core plunger is gripped and fixed between the radial rim 52 and a reinforcing washer 68 by means of rivets 70. Orifices 72 are formed through the washer 68, through the central part of the membrane 54 and through the radial rim 52 of the core plunger and are equipped with a directional delivery valve 74 which is of the same type as the aforementioned directional intake valve 62.

This valve 74 is fixed by riveting to the assembly comprising the radial rim 52, the membrane 54 and the reinforcing washer 68, and bears elastically deformable leaves which seal off the orifices 72 at their mouth into the delivery chamber 58.

This vacuum pump works as follows

When the coil 48 is powered with electricity, it exerts an electromagnetic force on the core plunger 50 and this force moves this core plunger in axial translation between the armature and the front part 38 of the casing of the vacuum pump. By applying a sinusoidal voltage to the coil, the core plunger 50 can be displaced in a reciprocating movement in the gap of the armature.

When the core plunger 50 is moved backwards, the air contained in the intake chamber 56 of the pump is compressed until the delivery valve 74 opens, its elastically deformable leaves flexing forwards and opening the orifices 72 via which the air can pass from the chamber 56 to the chamber 58. The latter communicates with the open front face of the rear part 38 of the casing and with the outside of the booster 12 via an orifice 76 in the front wall of the envelope 14 and of the reinforcing washer 42.

When the core plunger 50 is moved forwards, a vacuum is created in the intake chamber 56, and this results in the opening of the orifices 60, and the air contained in the chamber 16 of the booster is drawn into the chamber 56. The subsequent backward displacement of the core plunger 50 compresses the air contained in the chamber 56 and causes it to pass into the chamber 58, then out of the booster via the orifice 76. The repeated displacement of the core plunger 50 in reciprocating movement backward and forward results in the intake of the air contained in the chamber 16 of the booster and the delivery of this air to the outside of the booster, and therefore in a vacuum being created in the chamber 16.

The vacuum pump 36 can create the desired level of vacuum in the chamber 16 of the booster or alternatively may supplement a vacuum obtained by connecting the chamber 16 to the internal combustion engine intake manifold. The level of vacuum in the chamber 16 can be controlled by any known means with which pneumatic boosters are customarily equipped. The electrically conducting wires powering the coil 48 may pass either through the orifice 76 of the envelope 14 of the booster or through some other orifice in this envelope, analogous to the orifice 76 depicted.

I claim:

1. A braking device, for a motor vehicle, comprising a pneumatic booster (12) comprising an envelope (14) in which there is delimited a vacuum chamber (16), and a vacuum pump (36) connected to said chamber to create a vacuum therein, characterized in that the vacuum pump (36) is fixed to the envelope (14) of the booster on the inside of the latter within the vacuum chamber (16).

2. The device according to claim 1, characterized in that the vacuum pump (36) is of annular shape and is coaxial with the booster (12).

3. The device according to claim 2, characterized in that the vacuum pump (36) comprises an annular casing (38, 40) in which reciprocating controlled-displacement intake and delivery means are housed, said casing being fixed to a radial part of the envelope of the booster.

4. The device according to claim 3, characterized in that the vacuum pump (36) is of the electromagnetic type and comprises an annular armature (46) mounted in the casing (38, 40), a coil (48) housed in the armature, an axial core plunger (50) of tubular shape that moves in axial translation in the armature and the coil, and a sealed membrane (54) borne by the core plunger and by the casing and dividing the internal volume of the casing into an intake chamber (56) and a delivery chamber (58).

5. The device according to claim 4, characterized in that the intake chamber (56) of the casing communicates with the vacuum chamber (16) of the booster via at least one orifice (60) formed in a wall of the casing and fitted with a directional intake valve (62).

6. The device according to claim 5, characterized in that the delivery chamber (58) opens to the outside of the casing and communicates with the outside of the booster via at least one orifice (76) in the envelope (14) of the booster, and is connected to the intake chamber (56) by at least one orifice (72) formed in the membrane (54) and fitted with a directional delivery valve (74).

7. The device according to claim 6, characterized in that the core (50) comprises a radial rim (52) on which the membrane (54) is fixed and which bears the directional delivery valve (74).

8. The device according to claim 7, characterized in that the directional intake and delivery valves (62, 74) are shutters with elastically deformable leaves that shut off an orifice.

9. The device according to claim 8, characterized in that the casing of the vacuum pump is made of two axially juxtaposed annular parts (38, 40) fixed together in a sealed manner by elastic clip fastening.

10. The device according to claim 9, characterized in that it comprises a master cylinder (10) associated with the booster (12) and in that the vacuum pump (36) is fixed to the envelope (14) of the booster on the same side as the master cylinder (10).

11. The device according to claim 10 wherein the annular casing (38, 40) of the vacuum pump surrounds part of the master cylinder housed in the envelope (14) of the booster.

* * * * *